3,639,619
NEMATICIDAL AND FUNGICIDAL CYANIC DERIVATIVES

Daniel Demozay, Villeurbanne, Rodolphe Caffiero, Francheville-le-Bas, and Daniel Pillon, Lyon, France, assignors to Pechiney-Progil, Lyon, France
No Drawing. Filed Dec. 6, 1968, Ser. No. 781,969
Claims priority, application France, Dec. 8, 1967, 49,419
Int. Cl. A01n 9/20
U.S. Cl. 424—304                     1 Claim

ABSTRACT OF THE DISCLOSURE

A cyanic derivative having the formula

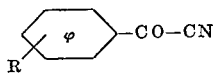

and utilization thereof in parasiticidal compositions.

---

The present invention relates to new compositions, adapted to be used as parasiticides for agricultural use, in particular as nematicides.

Compositions according to the invention include, as active material, at least one benzoyl cyanide having the formula

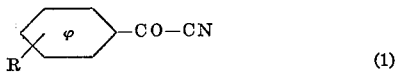

wherein R is one or more identical or different radicals selected from the groups include H, halogen, alkyl halogenated alkyl (in particular, $CF_3$ or $CCl_3$), nitro, cyano, alkoxy.

The compounds having the Formula 1 were prepared by the method described in "Organic Synthesis Collective," vol. 3, pages 112–114, which consists in allowing a benzoyl chloride to react with coppery cyanide according to the reaction

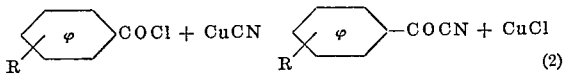

It is also possible to prepare said compounds by any of the other methods described in the above-mentioned report, and, in particular, by allowing hydrocyanic acid to react with benzoyl chloride, or benzoic anhydride.

We prepared in particular the following compounds by the method according to the above-mentioned formulation (2):

Product No. 1: Benzoyl cyanide—B.P. 205–208° C.
Product No. 2: 3-chloro-benzoyl cyanide—B.P. 114–117° C. under 20 mm. Hg
Product No. 3: Methoxy-2-dichloro-benzoyl cyanide— M.P. 42–43° C.
Product No. 4: 4-chloro-benzoyl cyanide—B.P. 120–122° C. under 24 mm. Hg, M.P. 40–41° C.
Product No. 5: 3-methyl-benzoyl cyanide—B.P. 102–103° C. under 14 mm. Hg
Product No. 6: 4-methyl-benzoyl cyanide—B.P. 110–112° C. under 14 mm. Hg, M.P. 47–48° C.

Now, our work made it possible to show that said compounds have outstanding parasiticidal, in particular nematicidal and fungicidal, properties, which enable them to be used as active materials in phyto-pharmaceutical compositions.

The pesticidal properties of the products of the invention were demonstrated by the following tests:

TEST 1

10 cc. of water were poured into a 250 cc. screw-cap powder flask, and then 4 drops of a concentrated solution of 4-day old nematodes (*Coenorhebditis elegens*) were added thereto. X cc. of a 100 g./l. solution of the product to be tested were pipetted in a second 250 cc. flask identical with the above one, and then 100 cc. of kaolin were poured immediately over said solution.

Said second flask was then joined mouth to mouth with the first-mentioned flask by means of a wire-gauze cap, which was intended for retaining the charge. The two flasks were kept joined together for 48 hours, after which the counting was performed by means of a binocular magnifying lens.

The successive dilutions of the active material were carried out in dimethylsulfoxide, for which previous tests had shown it had no action whatever on nematodes.

In comparison with the products of the invention, the same tests were performed with DD (a mixture of dichloropropane and dichloropropene), a nematicide very widely used in the field.

The results of the tests are given as death rate percent in the following table:

| | Cc. of active material (dilution in DMSO) | | | | |
|---|---|---|---|---|---|
| | 0.1 | 0.05 | 0.02 | 0.01 | 0.005 |
| Product No.: | | | | | |
| 1 | 100 | 100 | 100 | 100 | 100 |
| 2 | 100 | 100 | 100 | 100 | 100 |
| 3 | 100 | 100 | 100 | 100 | 100 |
| 4 | 100 | 100 | 100 | 100 | 100 |
| 5 | 100 | 100 | 100 | 100 | 100 |
| 6 | 100 | 100 | 100 | 100 | 100 |
| DD | 100 | *100 | *Intox. | *Intox. | 0 |

NOTE.—*="Intoxicated" means that the nematodes were immobilized only temporarily.

This test shows definitely the outstanding nematicidal properties of the products of the invention, since the latter kill all the nematodes at a dose twenty times smaller than that which should be required for a similar result when using one of the most sold commercial nematicides.

TEST 2

In this series of tests, which correspond to preventive treatments on plants, a wash containing 2 g./l. of active material is sprayed on the plant. The latter is then infected with spores of the fungus selected.

After from 5 to 15 days, depending on the fungus selected, the growth of said fungus is observed:

Corn-mildew: Product No. 2 provides complete protection against *Erisyphe graminis*, which is the cause of corn-mildew.

Alternaria: Products Nos. 1 and 2 prevent totally the growth of *Alternaria solani*, which is the cause of alternariosis in tomatoes.

The compounds of the invention should, for the practical use thereof, be formulated according to the techniques conventionally used in the pesticide industry.

Thus, they may be used as powders to be sprinkled, wettable powders, solutions, direct or reversed emulsions of water in oil, or oil in water, and the like.

Such various types of formulations require then the addition of inert carriers, such as clays, talc, or the like, and/or solvents, such as water or organic solvents, as well as various adjuvants adapted to further the use and improve the physical properties of the compositions produced. Such adjuvants may be, depending on the particular composition, emulsifying agents, and/or anticaking agents, and/or wetting agents, and/or sticking agents, and the like, the addition of which to parasiticidal compositions is well known to those skilled in the art.

We claim:
1. A method for controlling nematodes and fungi on plants comprising applying to a plant a nematocidally and fungicidally effective amount of a compound of the formula

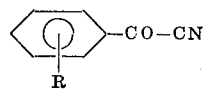

wherein R is one or more members selected from the group consisting of hydrogen, methyl, chloro and methoxy.

References Cited

UNITED STATES PATENTS 3,012,058  12/1961  Hauptschein _____ 424—304

OTHER REFERENCES

Horning, E.: "Organic Syntheses," vol. 3, pp. 112–114 (1955).

JEROME D. GOLDBERG, Primary Examiner

V. D. TURNER, Assistant Examiner